April 3, 1945. E. C. ZIMMERMAN 2,372,874
LIGHTING FIXTURE
Filed July 14, 1943
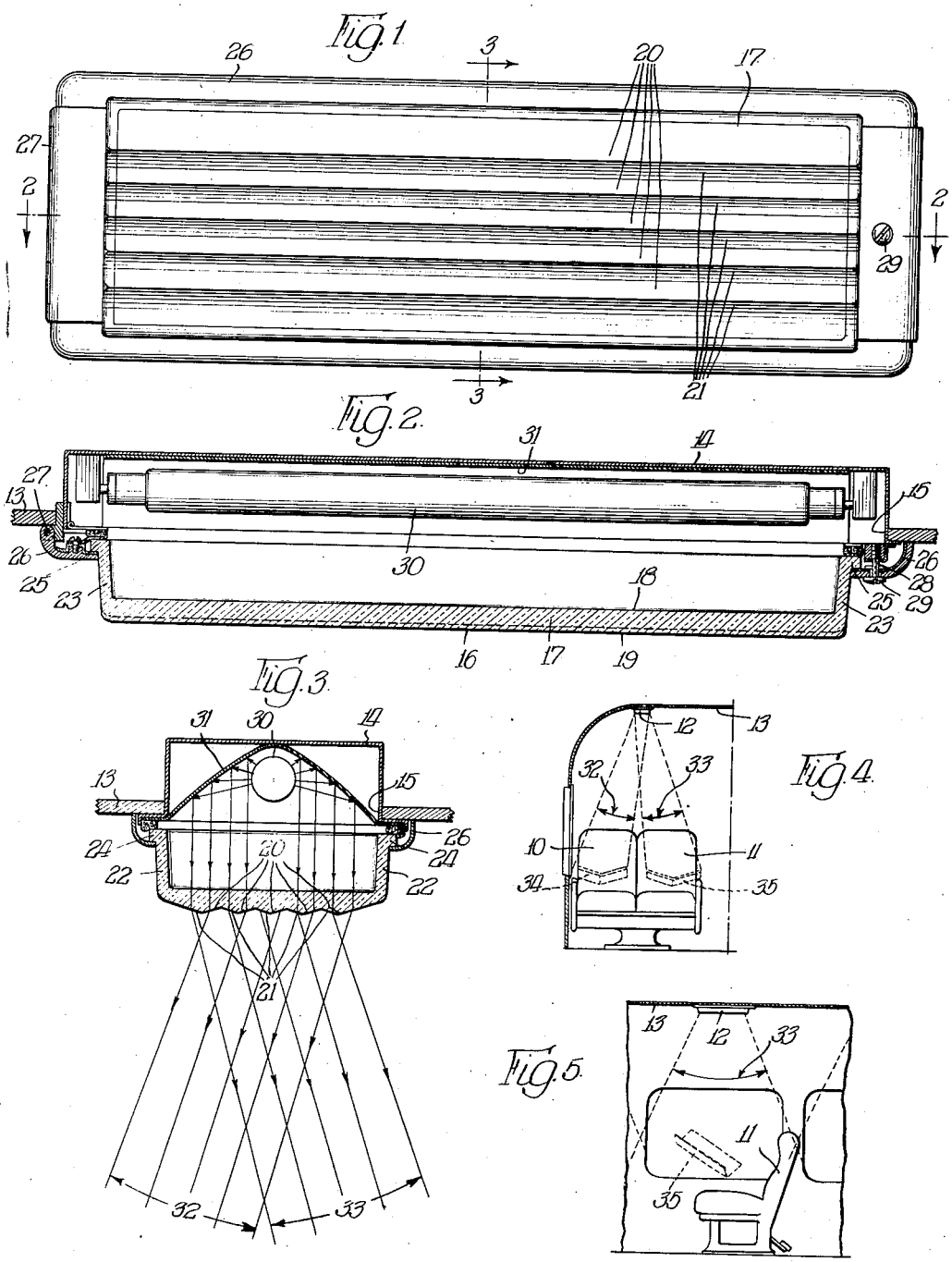
INVENTOR.
Edward C. Zimmerman,
BY
Cromwell, Greist & Warden.
Attys.

Patented Apr. 3, 1945

2,372,874

UNITED STATES PATENT OFFICE 2,372,874

LIGHTING FIXTURE

Edward C. Zimmerman, Winnetka, Ill., assignor to Patent License Corporation, Chicago, Ill., a corporation of Illinois Application July 14, 1943, Serial No. 494,602

3 Claims. (Cl. 240—7.35)

This invention has to do with the interior illumination of busses, street cars, railway coaches, airplanes and other passenger vehicles, and is particularly concerned with lighting fixtures of the type used in producing intensified light patterns over predetermined areas within such vehicles.

The principal object of the invention is to provide an improved lighting fixture of the type described in which a fluorescent tube or other single elongated light source is employed in connection with a unified prism structure to produce two intensified light patterns.

Other objects of the invention are to provide an improved lighting fixture of the type described which is comparatively inexpensive to manufacture, is easy to install, and is of unique and highly ornamental appearance.

The improved fixture can be used advantageously in many different arrangements. It can be used, for instance, over a pair of seats to provide two intensified areas of light for the reading planes of persons seated in those seats. It can be used over a center aisle to produce two diverging beams for illuminating areas at opposite sides of the aisle. It can be used crosswise of a reversible seat, or pair of reversible seats, for providing what amounts to peaks of light at two different reading planes for the same seat or seats, whereby to obtain adequate lighting for the reading planes of the seat or seats regardless of the direction in which the same happen to be facing. Still other uses will be obvious from the following disclosure.

While the foregoing statements are indicative in a general way of the nature of the invention, other more specific objects and advantages will be apparent to those skilled in the art upon a full understanding of the new fixture.

One embodiment of the invention is presented herein for the purpose of exemplification, but it will of course be appreciated that the invention is susceptible of incorporation in other structurally modified forms coming equally within the scope of the appended claims.

In the accompanying drawing:

Fig. 1 is a face view of the fixture;

Fig. 2 is a vertical longitudinal section, taken on the line 2—2 of Fig. 1;

Fig. 3 is a vertical transverse section, taken on the line 3—3 of Fig. 1;

Fig. 4 is a fragmentary transverse section through a typical passenger vehicle, showing one of the fixtures above a pair of seats, and showing schematically the transverse spread of the more intensified portions of the split beam of light emanating from the fixture; and Fig. 5 is a fragmentary longitudinal section through the vehicle, showing the same fixture and the longitudinal spread of the beam.

In Figs. 4 and 5 a seating arrangement is illustrated in which seats 10 and 11 are arranged in pairs, in longitudinally extending rows at opposite sides of a center aisle. The lighting fixture 12—which embodies the present invention—is shown in these views as mounted above two of the seats in a portion of the deck 13 of the vehicle. Instead of being mounted in the deck 13 the fixture might of course be mounted above the seats in the under side of a luggage rack, or in any other suitably located portion of the vehicle.

The lighting fixture 12 consists of a downwardly opening casing 14 of generally rectangular form which is elongated in the direction in which the seats 10 and 11 face and is positioned directly over such seats within an aperture 15 in the deck. A light transmitting panel 16 of generally rectangular form extends across the bottom of the casing 14 and is provided with a single split beam prism portion 17.

The prism portion 17 is substantially coextensive with the bottom of the casing 14 and has substantially the same cross section at all points throughout the greater part of its length. The upper or inside surface 18 of the prism portion 17 is flat, while the lower or outside surface 19 is divided up into a plurality of long narrow longitudinally extending strip-like prism areas 20 and 21. The prism areas 20 and 21 extend parallel to each other, and taper transversely in cross section, with adjoining areas tapering transversely in opposite directions, thereby giving the lower or outside surface 19 a longitudinally ribbed appearance. The prism areas 20 together form one light directing structure, while the prism areas 21 together form a second light directing structure. The lower or outside surfaces of the prism areas 20 are all preferably parallel to each other, and the corresponding surfaces of the prism areas 21 are likewise all preferably parallel to each other, as shown in Fig. 3.

The prism areas 20 and 21 are bordered by upwardly extending side and end walls 22 and 23 which terminate at their upper edges in outwardly extending side and end flanges 24 and 25. The walls 22 and 23, and also the flanges 24 and 25 are enameled, frosted, or otherwise shielded to make them light diffusing, whereby to provide relatively subdued side illumination for the interior of the vehicle in the vicinity of the fixture.

The panel 16 is removably secured to the bottom of the casing 14 by means of a frame 26, which frame closely surrounds the side and end walls 22 and 23 of the panel and engages against the under surfaces of the side and end flanges 24 and 25. The frame 26 is hinged at 27 to one end of the casing 14 and is secured at 28 to the other end of the casing by any readily releasable means, such as a screw 29.

The casing 14 houses a fluorescent tube 30 which extends longitudinally above the center of the prism portion 17 of the panel in vertically spaced parallel relation to the same. An inverted trough-like reflector 31 of longitudinally straight but transversely parabolic form is also positioned within the casing, above the tube 30, in centered relation to the prism portion 17.

The light rays which emanate from the tube 30 are reflected by the reflector 31 onto the prism portion 17 and pass through the two series of prisms 20 and 21 where they are bent to produce what amounts to a split beam characterized by laterally diverging peak portions 32 and 33.

If desired a louver plate of any suitable construction, provided with transversely extending vertically disposed louver strips, may be positioned in the casing between the bottom of the latter and the upper edge of the light transmitting panel, for restricting to a certain extent the longitudinal spread of the laterally split portions 32 and 33 of the beam.

The portions 32 and 33 are so directed as to provide intensified light patterns for the reading matter 34 and 35 shown in Figs. 4 and 5. If the seats are laterally offset with respect to the fixture, or if the fixture is laterally inclined because of the contour of the deck or other support, the portions 32 and 33 can be directed to one side or the other by merely shifting the tube 30 laterally within the fixture or changing the angles of the prism portions.

The lower or outer surfaces of the component areas in each of the divergent prism structures are all preferably parallel to each other, as shown in Fig. 3.

As the light source 30 is not a point or line source, but is instead a relatively wide luminous body, a certain amount of spreading of the reflected rays will take place within the casing, with a consequent spreading of each of the two divergent portions 32 and 33 of the beam, as illustrated in Figs. 4 and 5. This spreading is sufficient to produce light patterns of the desired area at the reading planes of the seats 10 and 11.

Another application of the lighting fixture in a passenger vehicle would be to have the fixture mounted crosswise with respect to the longitudinal axis of the vehicle and have the split beam pattern from the fixture cover the reading planes of passengers facing one way or the other where reversible seats are used. One of the intensified portions of the beam from the fixture would be placed to take care of one direction, while the other intensified portion of the beam would be placed to take care of the reverse direction.

While the improved fixture is especially applicable to the lighting of passenger vehicles, and has been described in that connection, it will of course be understood that the fixture is not limited in its use to vehicles and can be used advantageously in other quite different applications.

I claim:

1. An overhead lighting fixture for the interior of a passenger vehicle having seats arranged alongside each other in pairs and facing in the same direction, for producing two light intensifications for the reading areas of two passengers seated alongside each other in two of the seats, which light intensifications are elongated in the direction in which the seats face, comprising a light source which is located above the pair of seats and is elongated horizontally in the direction in which the seats face, a similarly elongated reflector of inverted U-shaped cross section centered generally above the light source, and a similarly elongated light transmitting panel centered generally below the light source, said reflector being so shaped and arranged as to reflect the light from the light source downwardly onto the panel, said panel being provided with a light direction portion for the reception of the rays which is substantially flat and horizontal and is divided transversely into a plurality of long narrow prisms, which prisms extend longitudinally of the light source and reflector and taper transversely in cross section, with adjoining prisms tapering in alternate directions, whereby to constitute of alternate prisms a multiple prism structure for producing with the light reflected from the reflector a light intensification which is centered generally over the reading area of one of the passengers and is elongated in the direction in which the seat of that passenger faces and constitute of the intervening prisms a second multiple prism structure for producing with the light reflected from the reflector another light intensification which is centered generally over the reading area of the other passenger and is elongated in the direction in which the seat of that passenger faces.

2. An overhead lighting fixture of the construction recited in claim 1, in which the upper surface of the light directing portion of the panel on the inside of the fixture is substantially flat and the lower surface of the light directing portion is characterized by a plurality of relatively wide and shallow V-shaped grooves.

3. An overhead lighting fixture of the construction recited in claim 1, in which the reflector is of parabolic form and the light source is a fluorescent tube.

EDWARD C. ZIMMERMAN.

CERTIFICATE OF CORRECTION.

Patent No. 2,372,874. April 3, 1945.

EDWARD C. ZIMMERMAN.

It is hereby certified that error appears in the printed specification of the above numbered patent requiring correction as follows: Page 2, first column, line 34, after the numeral "35" insert --of two persons seated side by side in the seats 10 and 11, as--; page 2, second column, line 30, claim 1, for "direction" read --directing--; and that the said Letters Patent should be read with this correction therein that the same may conform to the record of the case in the Patent Office.

Signed and sealed this 7th day of August, A. D. 1945.

(Seal)

Leslie Frazer
Acting Commissioner of Patents.